United States Patent [19]
Plasse

[11] 4,154,786
[45] May 15, 1979

[54] METHOD FOR PRODUCING A MATTRESS HAVING EMBEDDED SPRINGS, THE IMPLEMENTS USED AND THE MATTRESS OBTAINED

[76] Inventor: Robert Plasse, 6 Boulevard Anatole France, Lyon 6° (Rhone), France

[21] Appl. No.: 651,329

[22] Filed: Jan. 21, 1976

[30] Foreign Application Priority Data

Aug. 1, 1975 [FR] France .............................. 75 24603

[51] Int. Cl.² .............................................. B29D 27/04
[52] U.S. Cl. ..................................... 264/46.4; 5/477; 249/64; 264/46.5; 264/46.7; 264/46.9; 425/817 R
[58] Field of Search ................. 5/351, 245 R; 249/64; 264/46, 45.1, 46.2, 46.7, 46.9, 338, 46.4, 46.5; 425/817 R

[56] References Cited

U.S. PATENT DOCUMENTS

| | | | |
|---|---|---|---|
| 3,099,518 | 7/1963 | Wetzler | 264/46.2 |
| 3,204,016 | 8/1965 | Sanger et al. | 264/45.1 X |
| 3,453,350 | 7/1969 | Koechlin | 264/46.2 X |
| 3,480,203 | 11/1969 | Moritz et al. | 264/45.1 X |
| 3,624,190 | 11/1971 | Cekada et al. | 264/338 X |
| 3,920,609 | 11/1975 | Lehmann | 264/46.7 X |
| 4,116,735 | 9/1978 | Plasse | 5/351 X |

FOREIGN PATENT DOCUMENTS

| | | | |
|---|---|---|---|
| 1500828 | 10/1967 | France | 264/46.7 |
| 933892 | 8/1963 | United Kingdom | 264/46.7 |

*Primary Examiner*—Philip Anderson
*Attorney, Agent, or Firm*—Remy J. VanOphem

[57] ABSTRACT

A foam-producing mixture is poured directly into a mold, whose base is constituted by an inner movable wall and outer stationary wall which is provided with supports passing through holes in the inner wall in order to retain mattress springs by the frustums of cones. The springs also bear against an upper wall of the mold and are held solely by the forces of cohesion of the solidified foam.

5 Claims, 17 Drawing Figures

U.S. Patent May 15, 1979 Sheet 1 of 4 4,154,786
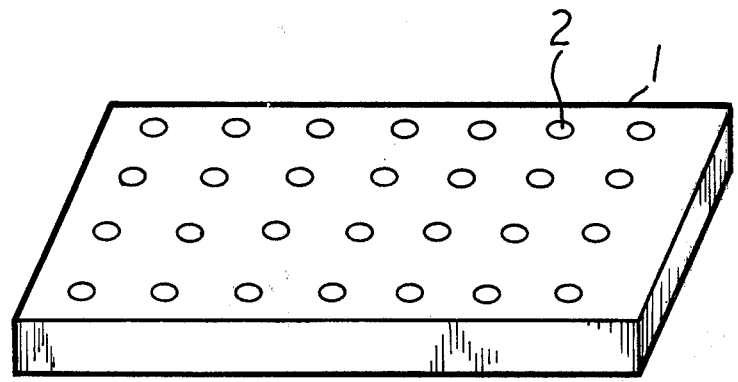
*Fig-1*
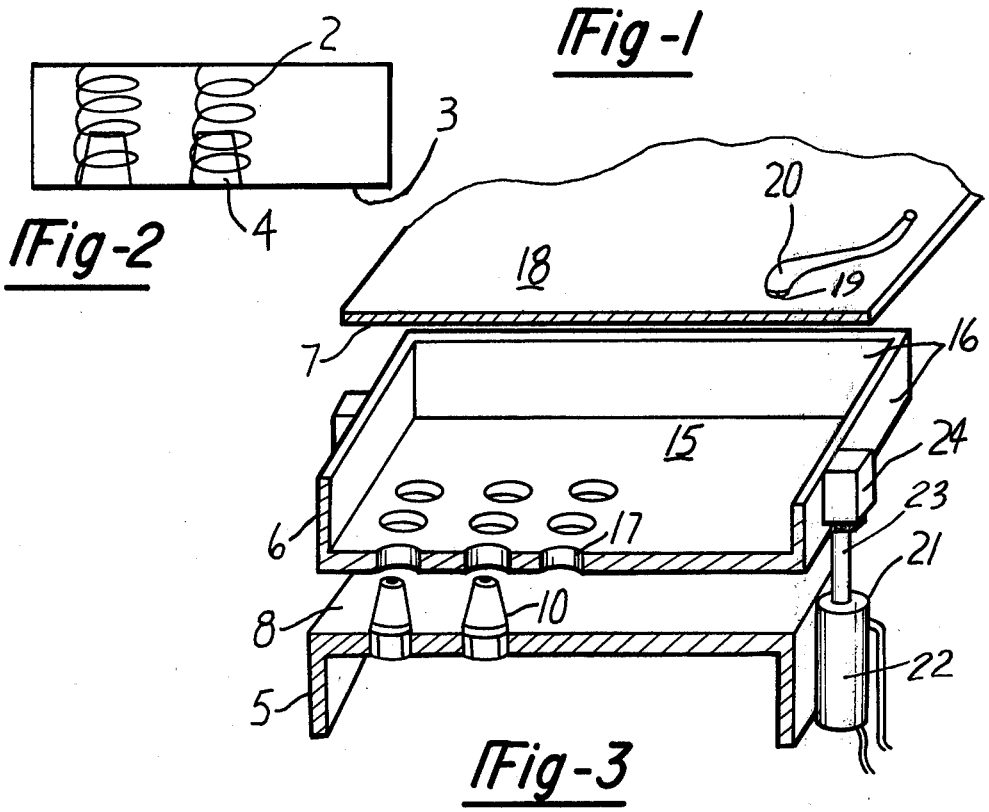
*Fig-2*
*Fig-3*
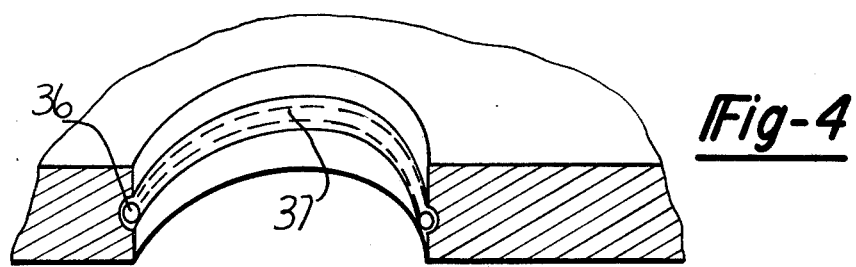
*Fig-4*

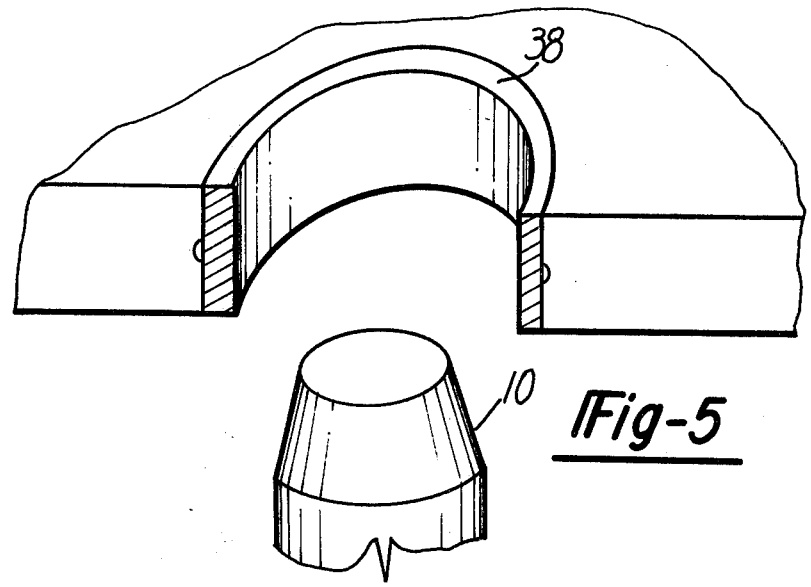
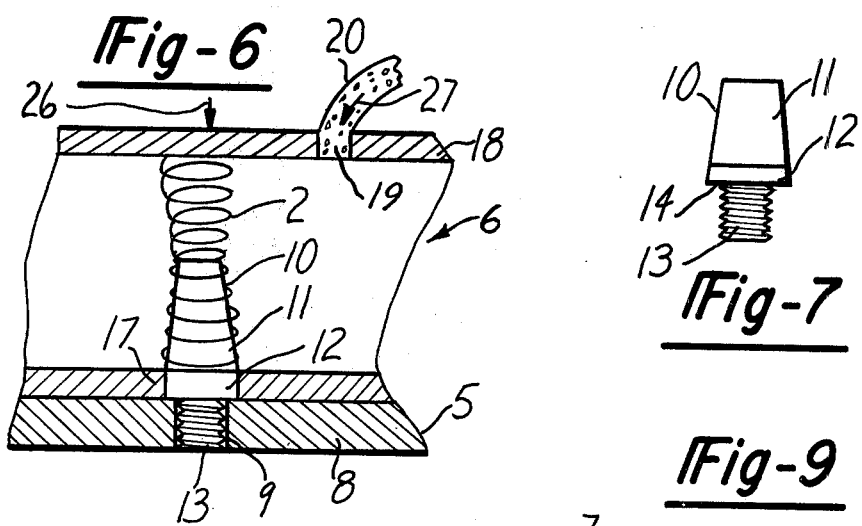
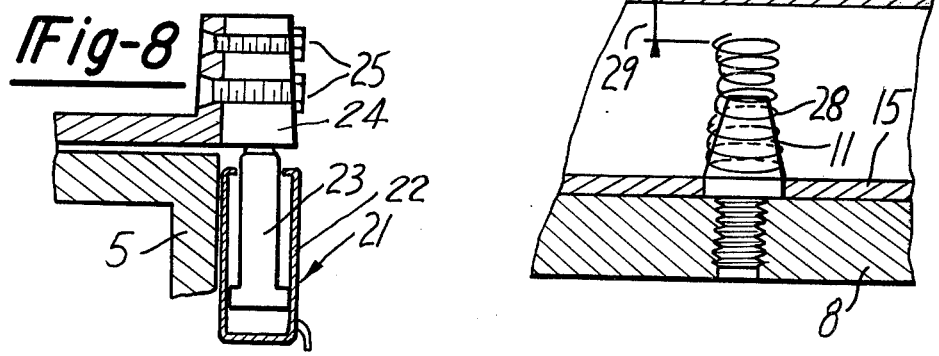

METHOD FOR PRODUCING A MATTRESS HAVING EMBEDDED SPRINGS, THE IMPLEMENTS USED AND THE MATTRESS OBTAINED

BACKGROUND OF THE INVENTION

1. Field of the Invention

The present invention relates to a method for the production of a mattress having embedded springs, the equipment used for its manufacture and the mattress thus obtained.

2. Reference to Related Art

Mattresses are known which are constituted by a metal framework about which is poured synthetic foam to form padding. The framwork is made separately on a machine which comprises a frame having the dimensions of the mattress. Coil springs are fixed on this frame, then they are interconnected by metal hooks or the like. In addition to bulky implements, this requires a great deal of manpower. In addition, the hooks or securing members increase the weight of the mattress.

The object of the present invention is to remedy these drawbacks by eliminating the need for a metal framework prior to molding the block of foam. A further object of the present invention is to provide a plurality of biconical springs within a mattress-forming mold by supporting said springs on frustoconical supports in said mold prior to forming a foamable synthetic resinous material for the mattress.

SUMMARY OF THE INVENTION

One method according to the invention, for the production of a mattress having springs embedded in synthetic foam by pouring material into a mold having an inner volume in the shape and dimensions of a mattress, is characterized in that the springs are secured on one of the two major walls of the mold before pouring the foam, so that after stripping, the springs are retained solely by the forces of cohesion of the foam.

According to an additional feature of the invention, the common length of the springs is chosen such that each bears simultaneously against the two major sides of the mold, when the mold is closed.

According to a variation of the invention, the common length of the springs is chosen such that each rests at one end against the major side of the mold to which it is secured, whereas its free end remains at a distance from the other wall of the mold.

According to another variation of the invention, a sheet of foam is provided, interposed between one of the major walls of the mold and the free ends of the springs, such that the material is poured into the remaining volume of the mold, becoming connected to the sheet of foam after cooling.

A mold used for carrying out a method of manufacture according to the invention is characterized in that it comprises a base comprising two parts, namely:

a first part provided with a hole at the location of each spring, a so-called inner part; and a second part integral with a support at the location of each spring, a so-called outer part, such that each support of the second part engages in a hole of the first part when the two parts are placed in a flat position one against the other, each spring thus being able to be secured on the base by fitting on a support, whilst for stripping from the mold, the outer part may firstly be disengaged from the inner part.

According to an additional feature of the invention, each support of the outer part has a shape of revolution about an axis perpendicular to the plane of the base and comprises:

a cylindrical part adapted to completely fill the corresponding hole of the inner part when the two parts are placed in a flat position one against the other; and a frusto-conical part whose flared end is adjacent the cylindrical part, such that the coil springs fit on the supports with the frusto-conical parts internally tangential with respect to the turns of the spring.

According to an additional feature of the invention, the total height of a support is less than the length of a spring, whereas the springs are bi-conical and flare out towards the ends, such that the frusto-conical part of a support co-operates solely with half the turns of the spring.

According to an additional feature of the invention, the inner part of the base is integral with the four lateral walls of the mold, whereas the outer part of the base constitutes a stationary horizontal stand integral with vertical rams whose moving parts are able to bear simultaneously at several points under the inner part in order to raise and strip it.

According to an additional feature of the invention, the corners of the mold, adjacent the points where its walls join, are filled such that the mattress has rounded corners.

A spring mattress according to the invention is characterized in that its springs are retained solely by the forces of cohesion of the embedding foam.

BRIEF DESCRIPTION OF THE DRAWINGS

FIG. 1 is a perspective view of a mattress according to the invention;

FIG. 2 is a sectional view on line II—II (FIG. 1);

FIG. 3 is a perspective view of a mold according to the invention, in cross section;

FIG. 4 is an enlarged view of a detail IV in FIG. 3;

FIG. 5 is an enlarged view of a detail IV in FIG. 3 according to a variation;

FIG. 6 is a partial section VI—VI in FIG. 3 of an assembled mold;

FIG. 7 shows a spring support;

FIG. 8 is a partial section VIII—VIII in FIG. 3 of an assembled mold;

FIGS. 9 to 13 are views similar to that of FIG. 6, illustrating variations of the method of manufacture of the mattress;

FIG. 1 shows a mattress according to the invention as it appears on leaving the mold. It is a block of polyurethane foam 1 which comprises inner coil springs 2 embedded in the foam. The number and distribution of the springs are conventional. On the other hand, it is particularly remarkable that these springs are solely held in place by the forces of cohesion of the foam (FIG. 2). The two ends of each spring are flush with the outer surfaces of the mattress. In addition, adjacent the lower base 3 of the mattress, a frusto-conical recess 4 in the foam is provided at the center of each spring. This recess is internally tangential with the turns of the lower half of the springs 2, which are bi-conical. A recess is flared towards the base 3, like the corresponding part of the springs.

FIGS. 3-6 show a mold serving for the manufacture of this mattress. This mold comprises three parts, namely: stand 5, a box 6, and a cover 7.

Figure 10:
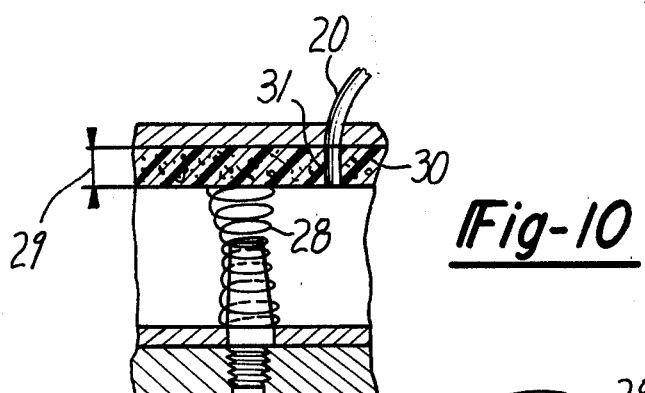

The stand 5 is stationary and its upper wall 8 is horizontal and in fact constitutes the outer part of the base of the mold. The wall 8 has substantially the dimensions of a mattress placed in the flat position and it is provided with as many tapped holes 9 as there are springs 2, according to an identical distribution. A support 10 is screwed into each hole. Each support 10 (FIGS. 5 and 6) is constituted by the frustum of a cone 11 whose end is extended by a portion of a cylinder 12 followed by a coaxial screwthreaded end 13. The outer diameter of the screwthreaded end 13 is less than the diameter of the portion of the cylinder 12 and the portion 12 is bordered by a shoulder 14 towards the end 13. It is thus this end 13 which is screwed into the hole 9 and the shoulder 14 is locked against the upper side of the wall 8 (see also FIG. 7).

The box 6 comprises a major wall 15, bordered by four lateral walls 16 and which in fact constitutes the inner part of the base of the mold. This box 6 has the same dimensions as the wall 8 of the stand. Each hole 9 in the wall 8 corresponds to a coaxial hole 17 in the wall 15, when the two walls are in facing relationship. The diameter of a hole 17 is slightly greater than the diameter of the portion of the cylinder 12 and the thickness of the wall 15 is substantially equal to the height of said portion of the cylinder 12.

According to a variation (FIG. 4), the wall of each hole 17 comprises a circular groove 36 in which is housed an annular gasket 37.

According to another variation (FIG. 5), the wall of each hole 17 is provided with a lining 38 of a polytetrafluoroethylene, such as teflon, in admixture with silicone as a release agent, which is slightly flexible.

In both cases, the purpose of these devices is to ensure a seal in the region of the supports 10, which are made of polypropylene or aluminum.

The cover 7 is constituted by a simple wall 78, whose dimensions are greater than those of the box 6 and which is provided with a hole 19 connected at its upper part to the mouth of a pipe 20.

Several rams 21 are also fixed all around the mold. Each ram comprises a cylinder 22 which is stationary, with its axis arranged vertically, against a lateral wall of the stand 5. The piston 23 is able to leave its cylinder in an upwards direction in order to co-operate with an abutment 24 made integral with a lateral wall 16 of the box 6 by means of bolts 25.

The operation is as follows (FIG. 6).

Initially, the pistons 23 of the rams 21 are retracted and the box 6 is placed on the stand 5 with the walls 8 and 15 in a flat position one against the other. Simultaneously, the cylindrical parts 12 of the supports 10 fill the holes 17 and the frusto-conical parts 11 of the supports project inside the box 6. It will be seen that the height of the parts 11 is substantially equal to half the height of the box 6. Each of these parts 11 is covered with a spring 2 which is bi-conical and whose turns are centered automatically on the axis of the support 10, the lower turn resting against the wall 15 and the length of which is substantially equal to the height of the box 6. When the cover 7 is placed on the box 6, the lower side of its wall 18 thus comes into contact with the upper turn of each spring 2. The mold is clamped by pressure means which are not shown, but which produce an ascending vertical force 26 on the cover. A mixture 27 of synthetic resin and activating agent is then poured into the mold through the pipe 20.

This mixture reacts in known manner by producing a gaseous emission in its mass, such that it increases in volume and fills all the empty parts of the mold. After a certain time, the foam solidifies. It then remains solely to strip the mattress from the mold. Before stripping the box 6, one begins by disengaging the stand arrangement 5 owing to the simultaneous action of the pistons 22 of the rams 21 on the abutments 24. The supports 10 are extracted from the foam, leaving their impression 4 therein, the remainder of the stripping operation being simpler since solely flat walls are in contact with the material.

According to one variation of the invention, the springs 2 are replaced by shorter springs 28, such that their upper turns remain at a distance 29 from the lower side of the wall of the cover 7 (FIGS. 9 and 10). The springs no longer appear flush with the surface of the mattress, but remain at a depth 29 from this surface. This solution is preferable in certain cases, for example, if the springs risk constituting hard and troublesome lumps or if they are likely to rust thus staining the upper surface.

According to another variation, these same springs 28 which are shorter than the springs 2 are used, but on this occasion there is interposed between their upper end and the wall 18 of the cover 7, a sheet 30 of solid synthetic foam. This sheet 30 has the dimensions of the mattress 1 as regards length an width and has a thickness 29. Before pouring the liquid mixture into the mold, care is taken to extend the hole 19 in the cover by a coaxial hole 31 in the sheet 30 (FIG. 10).

When the mixture rises, then solidifies, it sticks to the sheet 30, which is thus connected to the mattress. In this case also, the springs 28 remain at a depth 29 from the upper surface of the mattress.

Figure 11:
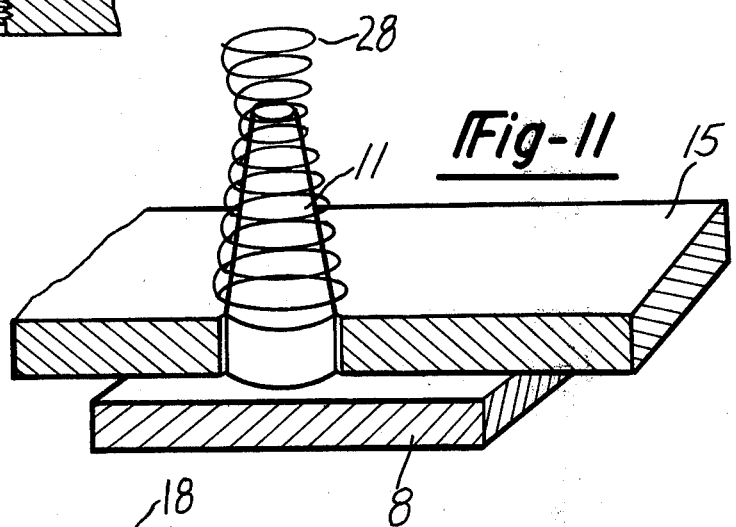
Figure 12:
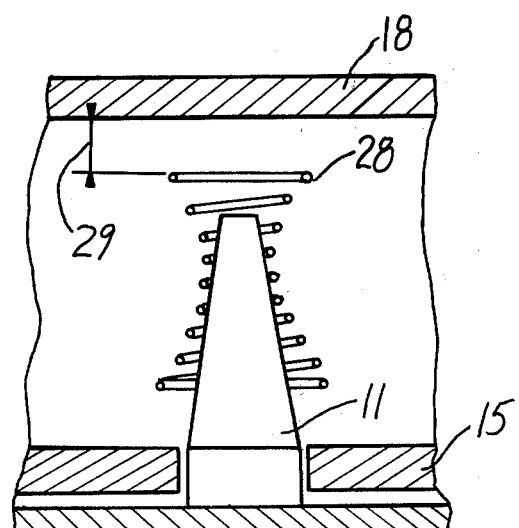
Figure 17:
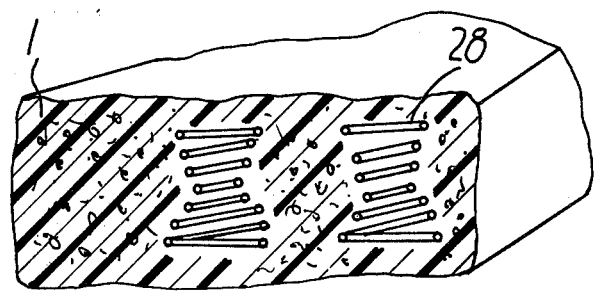
FIG. 17 is a partial section of the mattress showing the arrangement of the springs.

According to another variation (FIGS. 11 and 12), the relative dimensions of the springs 28 and supports 10 are provided such that the central part of each spring fits on the top of the cone 11, whereas the upper and lower ends of each spring remain at a distance from the walls of the mold. In this case, the springs are not flush with either of the two sides of the mattress (FIG. 17).

Figure 13:
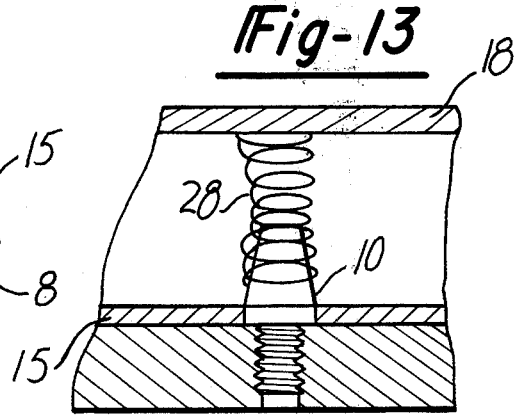

According to another variation (FIG. 13), the dimensions of the springs are provided such that the upper end of each spring touches the upper wall of the mold, whereas its lower end remains at a distance from the lower wall.

Figure 14:
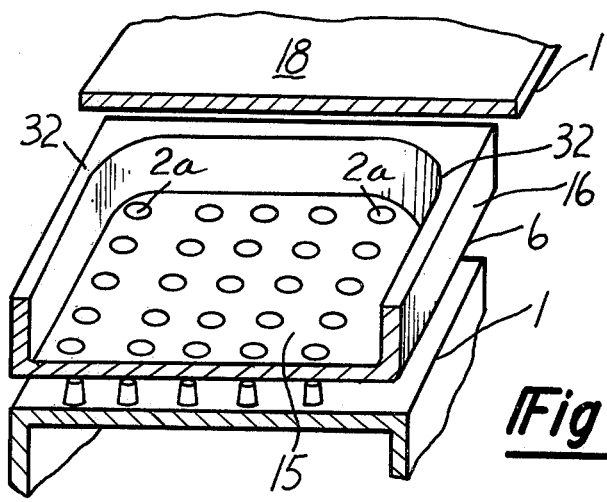
FIG. 14 is a perspective view of a mold according to a variation of the invention, shown in cross section.

According to another variation, inside the box 6, the corners formed by the lateral walls 16 are filled. These walls are thus connected along surfaces 32 in the form of a quarter of a cylinder (FIG. 14). In this case, it is possible to eliminate each corner spring 2a.

Figure 15:
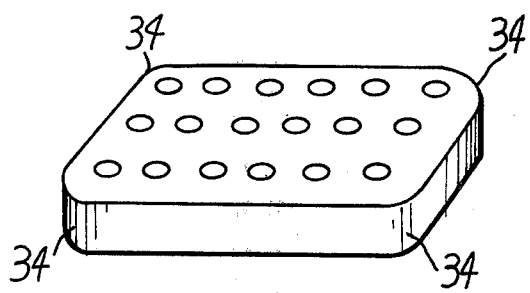
FIG. 15 is a perspective view of a mattress obtained with the mold of FIG. 14.
Figure 16:
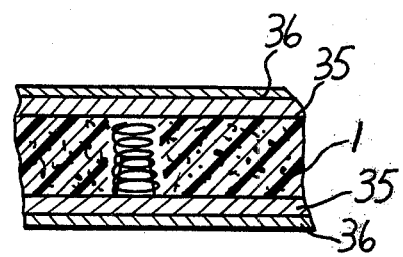
FIG. 16 is a partial cross section of a mattress provided with its outer finishing covers.

The mattress obtained thus far has four rounded corners 34 (FIG. 15). The mattress is then covered with a textile padding material 35, then with a layer of decorative fabric 36 (FIG. 16).

By choosing another type of synthetic foam, it is clearly possible to produce a mattress according to an identical method.

The essential advantage of the invention resides in that one eliminates the use of the traditional metal framework for locating the springs and which has to be manufactured on another machine prior to the pouring of the foam.

What is claimed is:

1. In a method for producing a mattress of the type wherein a synthetic material is foamed in a mold about a plurality of coil springs, the improvement which comprises:
   (a) disposing in a mold, without pre-compression, a plurality of bi-conical springs, each spring in the mold being supported on an associated mold support comprising a frusto-conical portion, no greater than one-half of each spring engaging its associated support about the frusto-conical portion thereof;
   (b) forming a foamable synthetic resinous material;
   (c) foaming the foamable synthetic resinous material in the mold and about the springs to embed the springs in the foam;
   (d) removing the support from the mold to provide a frusto-conical recess at the center of each spring;
   (e) stripping the foam from the mold, and
   wherein the springs are installed independently of one another and are solely retained by the cohesive forces of the solidified foam, the medial portion of each bi-conical spring being supported by the upper end of the associated support such that upon removal of the associated support the lower turnings of each spring is tangential to the hollow recess associated therewith.

2. The improvement of claim 1, characterized in that the length of each spring is chosen such that it bears simultaneously against the two inner opposed major sides of the mold, when the mold is closed.

3. The improvement of claim 1, characterized in that the length of each spring is chosen such that it is in contact, at one end, with one of the two major sides of the mold, whereas the other end of the spring remains at a distance from the other major wall of the mold.

4. The improvement of claim 1, characterized in that the length of each spring is chosen such that its two axial ends remain at a distance from the major walls of the mold.

5. A method according to claim 3, characterized in that prior to pouring the material, a block of solid foam is interposed between at least one of the inner major sides of the mold and the free ends of the springs, such that the material poured into the empty inner volume of the mold sticks to the sheet of solid foam which becomes integral with the mattress after cooling.

* * * * *